United States Patent
Shao et al.

(10) Patent No.: US 10,600,373 B2
(45) Date of Patent: Mar. 24, 2020

(54) DISPLAY DEVICE AND METHOD OF DRIVING THE SAME

(71) Applicants: BOE Technology Group Co., Ltd., Beijing (CN); BEIJING BOE DISPLAY TECHNOLOGY CO., LTD., Beijing (CN)

(72) Inventors: Xibin Shao, Beijing (CN); Zhanchang Bu, Beijing (CN); Ming Chen, Beijing (CN); Jieqiong Wang, Beijing (CN); Junjie Guo, Beijing (CN); Cuilan Huang, Beijing (CN); Dong Liang, Beijing (CN); Bo Feng, Beijing (CN); Wenjia Sun, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 63 days.

(21) Appl. No.: 15/769,491

(22) PCT Filed: Nov. 16, 2017

(86) PCT No.: PCT/CN2017/111293
§ 371 (c)(1),
(2) Date: Apr. 19, 2018

(87) PCT Pub. No.: WO2018/214422
PCT Pub. Date: Nov. 29, 2018

(65) Prior Publication Data
US 2019/0066605 A1    Feb. 28, 2019

(30) Foreign Application Priority Data
May 25, 2017 (CN) .......................... 2017 1 0381281

(51) Int. Cl.
*G09G 3/34* (2006.01)
*F21V 8/00* (2006.01)
*G02F 1/1335* (2006.01)

(52) U.S. Cl.
CPC .......... *G09G 3/342* (2013.01); *G02B 6/0068* (2013.01); *G02F 1/133615* (2013.01);
(Continued)

(58) Field of Classification Search
CPC .. G09G 3/342; G09G 3/3426; G09G 2360/16; G09G 2300/023;
(Continued)

(56) References Cited

U.S. PATENT DOCUMENTS

| 2015/0042923 A1* | 2/2015 | He | G02B 6/0038 349/65 |
| 2015/0185397 A1* | 7/2015 | Klement | G02B 6/0035 345/690 |
| 2018/0031875 A1 | 2/2018 | Qin et al. | |

FOREIGN PATENT DOCUMENTS

| CN | 102705763 A | 10/2012 |
| CN | 103225773 A | 7/2013 |

(Continued)

OTHER PUBLICATIONS

International Search Report and Written Opinion, including English translations, for International Application No. PCT/CN2017/111293, dated Dec. 20, 2017, 24 pages.

*Primary Examiner* — Aneeta Yodichkas
(74) *Attorney, Agent, or Firm* — Westman, Champlin & Koehler, P.A.

(57) ABSTRACT

A display device includes: a side-lighting backlight source, a display panel, and a light controlling component; the side-lighting backlight source comprises a light guide plate and a plurality of light emitting devices; the light guide plate includes a plurality of first regions and a brightness of a light (Continued)

emitting face of each of the first regions is controllable by at least one of the light emitting devices; the light controlling component includes a plurality of second regions configured such that one of the first regions covers at least one of the second regions; the brightness of the light emitting face of each of the first regions and a light transmittance of each of the second regions are controlled according to the contrast of the image to be displayed by a corresponding region of the liquid crystal display panel.

16 Claims, 5 Drawing Sheets

(52) U.S. Cl.
CPC ......... *G09G 3/3426* (2013.01); *G02B 6/0036* (2013.01); *G02F 2001/133601* (2013.01); *G09G 2300/023* (2013.01); *G09G 2320/0238* (2013.01); *G09G 2320/066* (2013.01); *G09G 2320/0646* (2013.01); *G09G 2320/0686* (2013.01); *G09G 2360/16* (2013.01)

(58) Field of Classification Search
CPC ..... G09G 2320/0646; G09G 2320/066; G09G 2320/0686; G09G 2320/0238; G02F 1/133603; G02F 1/1347; G02F 1/133606; G02F 2001/133607; G02B 6/0073; G02B 6/0036; G02B 6/0035; G02B 6/0068
See application file for complete search history.

(56) References Cited

FOREIGN PATENT DOCUMENTS

| | | |
|---|---|---|
| CN | 103851407 A | 6/2014 |
| CN | 105974672 A | 9/2016 |
| CN | 106952621 A | 7/2017 |
| JP | H09-197405 A | 7/1997 |
| JP | 2008-96458 A | 4/2008 |

\* cited by examiner

DISPLAY DEVICE AND METHOD OF DRIVING THE SAME

CROSS-REFERENCE TO RELATED APPLICATION

This application is a Section 371 National Stage Application of International Application No. PCT/CN2017/111293, filed Nov. 16, 2017, which is not yet published, and claims the priority benefit of Chinese Patent Application No. 201710381281.3 titled "Display device and method of driving the same" filed on May 25, 2017 in the State Intellectual Property Office of China, the whole disclosure of which is incorporated herein by reference.

TECHNICAL FIELD

Embodiments of the present disclosure relate to technical field of display, and particularly to a display device and a method of driving the display device.

BACKGROUND

Liquid crystal display (LCD) has advantages such as light weight, low power consumption, ease driving operation and non-harmful-radiation, has been widely used in a television, a notebook computer, a mobile phone, a person digital assistant and other modern information equipment and obtains a wide development. As a LCD itself emit no light, a backlight source is usually provided at a back face of the LCD to achieve an image display.

In order to increase a contrast of an image displayed on a LCD and improve a dynamic smear of the LCD, a high dynamic contrast range (HDR) technology appears recently, which can increase brightness range while increasing a contrast between an image with highest brightness and a darkest image. The high dynamic contrast range technology may not only bring a wider color gamut but also achieve color effect of whiter or blacker such that a user may view more detail of an image, thereby largely improving display effect. The high dynamic contrast range technology is applied to divide a backlight source into a plurality of areas in a certain direction, each area being called as a partitioning block, which may be rectangular, and meanwhile, to divide a LCD into a plurality of partitioning blocks corresponding to those of the backlight source. A projection of each of the partitioning blocks of the backlight source is of superposition with a projection of each partitioning block of the LCD, which is located over the backlight source, in a vertical direction. Light from each partitioning block of the backlight source is incident to the LCD for displaying an image and the light and dark contrast of the image displayed is achieved by individually adjusting the brightness of each partitioning block of the backlight source.

Generally, the higher the high dynamic contrast range is, the better the display effect is. In addition, a contrast value for the HDR prescribed by the HDR industry standard is 10000:1, even 20000:1. When a HDR contrast value is 20000:1, a brightness of an image displayed is 1000 nits in a bright state and is 0.05 nits in a dark state. In order to obtain a higher HDR contrast value, the number of the partitioning blocks of the backlight source is set as more as possible.

It is needed to provide an ultrathin display device with a higher dynamic contrast.

SUMMARY

Embodiments of the present disclosure provide a display device and a method of driving the display device, and provide at least an ultrathin display device with a higher dynamic contrast.

An embodiment of the present disclosure provides a display device including: a side-lighting backlight source, a display panel at a light exit side of the side-lighting backlight source, and a light controlling component between the display panel and the side-lighting backlight source; wherein, the side-lighting backlight source comprises a light guide plate and a plurality of light emitting devices at a side of the light guide plate, the plurality of light emitting devices being configured to emit light to the light guide plate from the side of the light guide plate;

the light guide plate includes a plurality of first regions and a brightness of a light emitting face of each of the first regions is controllable by at least one of the plurality of light emitting devices according to a contrast of an image to be displayed by a corresponding display region of the display panel;

the light controlling component is configured to transmit light from the light guide plate to the display panel and comprises a plurality of second regions, the plurality of second regions being configured such that one of the first regions corresponds to at least one of the second regions such that light from the one of the first regions passes through the at least one of the second regions; and the light controlling component is configured to control a light transmittance of each of the second regions according to the contrast of the image to be displayed by the corresponding region of the display panel.

In an optional embodiment, in the above display device provided by embodiments of the present disclosure, the light guide plate is in a shape of rectangle and the light emitting devices are at two longer sides of the light guide plate respectively.

In an optional embodiment, in the above display device provided by embodiments of the present disclosure, a light guide structure is provided on a light emitting face of the light guide plate and configured to control light to be emitted perpendicularly to the display panel.

In an optional embodiment, in the above display device provided by embodiments of the present disclosure, the light guide structure is a ridge structure extending along a shorter side of the light guide plate.

In an optional embodiment, in the above display device provided by embodiments of the present disclosure, one column of the first regions correspond to one column of the second regions and one first region of the one column of the first regions corresponds to multiple second regions of the one column of the second regions such that light from the one first region of the one column of the first regions passes through the multiple second regions of the one column of the second regions.

In an optional embodiment, in the above display device provided by embodiments of the present disclosure, the light controlling component comprises: an array substrate and a counter substrate opposite to each other, and a light modulating layer between the array substrate and the counter substrate, the light modulating layer being configured to control a light transmittance; wherein the light controlling component comprises no light resistance layer.

In an optional embodiment, in the above display device provided by embodiments of the present disclosure the light modulating layer is a liquid crystal layer or an electrochromic layer.

In an optional embodiment, in the above display device provided by embodiments of the present disclosure, the light controlling component includes a plurality of pixel units and each of the second regions comprises at least one pixel unit.

In an optional embodiment, in the above display device provided by embodiments of the present disclosure, the pixel units of the light controlling component are in one-to-one correspondance to pixel units of the display panel.

In an optional embodiment, the above display device provided by embodiments of the present disclosure further includes: control circuits being in one-to-one correspondance to and in electrical connection with the side-lighting backlight source, the display panel and the light controlling component; and a processor electrically connected to the control circuits;
wherein, the processor is configured to
acquire a contrast of an image being currently displayed and a contrast of an image to be displayed by the display panel through the control circuits electrically connected to the display panel,
determine the brightness of the light emitting face required for respective first region of the side-lighting backlight source and light transmittances required for respective second regions of the light controlling component according to the contrast of the image being currently displayed and the contrast of the image to be displayed, and
modulate the brightness of the light emitting face of the respective first region by using the control circuit electrically connected to the side-lighting backlight source and the light transmittances of the respective second regions by the control circuit electrically connected to the light controlling component, such that the light coming from the side-lighting backlight source and passing through the light controlling component permits the display panel to display an image with a desired contrast.

Embodiments of the present disclosure provide a method of driving the above display device, the method including:
acquiring a contrast of an image currently displayed and a contrast of an image to be displayed by the display panel;
determining the brightness required for the light emitting face of respective first region of the side-lighting backlight source and light transmittances required for respective second regions of the light controlling component respectively according to the contrast of the image being currently displayed and the contrast of the image to be displayed by the display panel; and
modulating the brightness of the light emitting face of the respective first region to a desired brightness and modulating the light transmittances of the respective second regions to desired light transmittances, such that the light coming from the side-lighting backlight source and passing through the light controlling component permits the display panel to display an image with a desired contrast.

DETAILED DESCRIPTION OF THE EMBODIMENTS

A display device and a method of driving the display device according to embodiments of the present disclosure will be described in detail by combination with the drawings.

Shapes and sizes of various layers in the drawings do not reflect actual scale of them in the display device, but are intended to schematically illustrate the content of the present disclosure.

The display device provided by the embodiments of the present disclosure may be a mobile phone, a tablet computer, a television, a display, a notebook computer, a digital photo frame, a navigator, a smart watch, a fitness wristband, a person digital assistant or any other product or component that has a display function, and is not limited herein.

Figure 1:
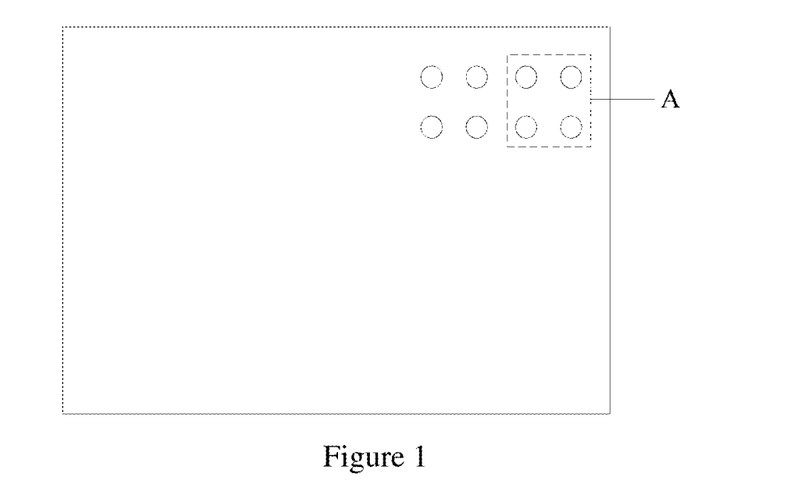
FIG. 1 and FIG. 2 are respectively principle schematic views of a high dynamic contrast and direct-lit display module.
Figure 2:
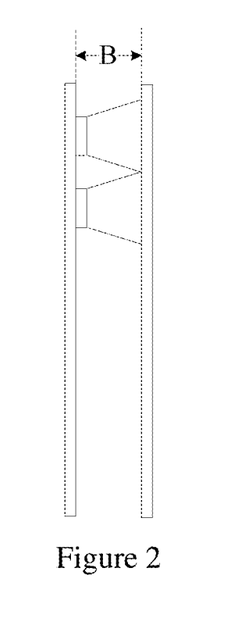

As for a liquid crystal display, depending on a location of a light source in a backlight source, the backlight source may be classified as a direct-lighting type backlight source and an edge-lighting type backlight source. The edge-lighting type backlight source commonly has a thickness of about 5 mm, and thus is widely used in order to achieve a thinned display device. However, as the edge-lighting type backlight source itself only includes lamp bars composed of light sources and arranged at periphery of the light guide plate, it is difficult to obtain an increased number of partitioning blocks and thus it is impossible to achieve relative higher HDR contrast value for ensuring a relative better display effect. As such, as shown in FIG. 1, currently, a direct-lighting type backlight source is partitioned into a plurality of partitioning blocks A so as to achieve a relative higher HDR contrast value for the display device. However, as shown in FIG. 2, as the direct-lighting type backlight source commonly needs a light mixing distance B more than 25 mm, which results in that the direct-lighting type backlight source has a relative large thickness, and thus a conventional display device cannot achieve an ultrathin effect (for example, having a thickness less than 10 mm).

Figure 3A:
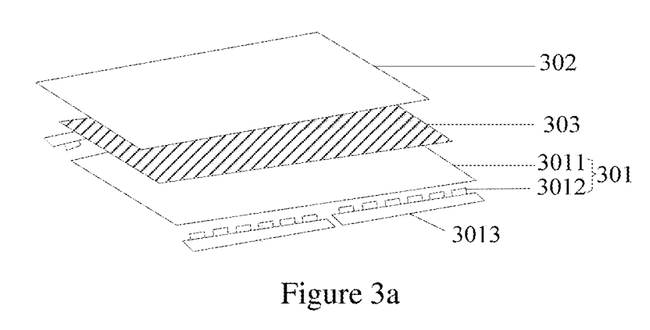
FIG. 3a and FIG. 3b are respectively structural schematic views of a display device provided by an embodiment of the present disclosure.
Figure 3B:
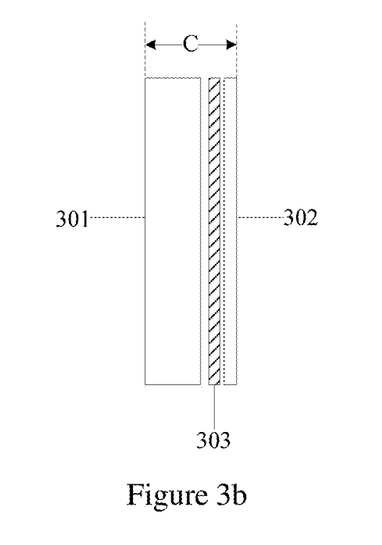
Figure 4:
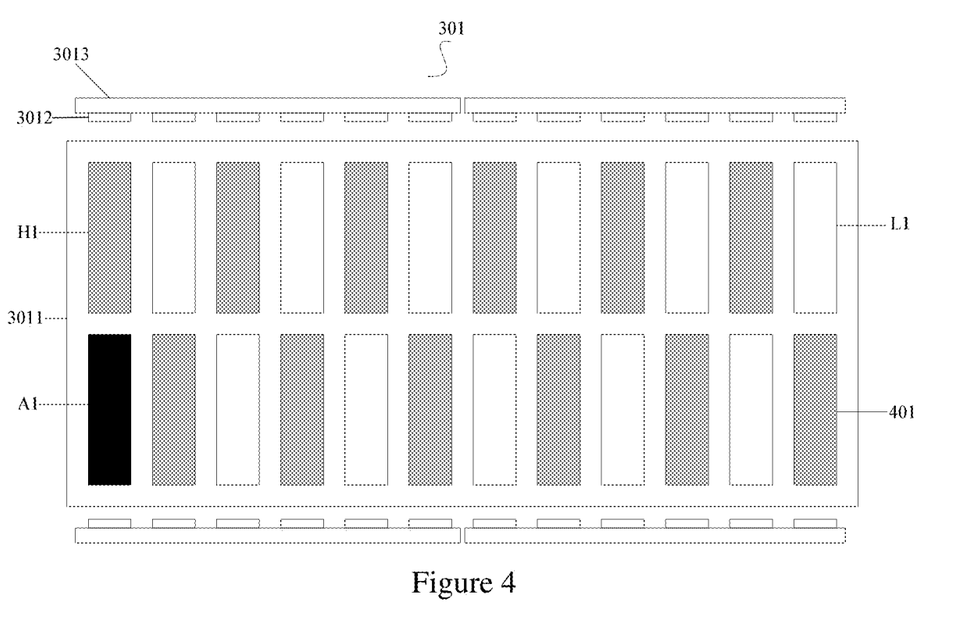
FIG. 4 is a schematic view of principle of partitioning block of an side-lighting backlight source provided by embodiments of the present disclosure.
Figure 5:
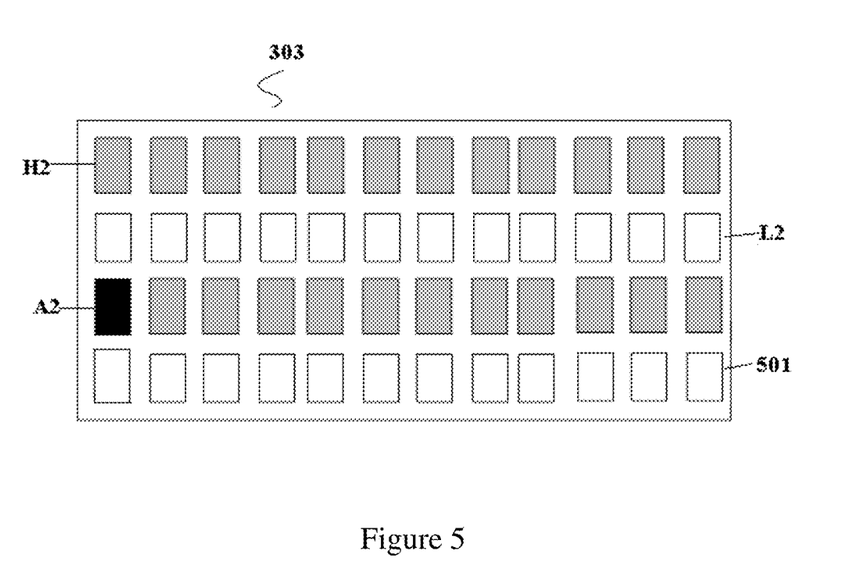
FIG. 5 is a schematic view showing a principle of partitioning blocks of a light controlling component provided by an embodiment of the present disclosure.

Embodiments of the present disclosure provide a display device, as shown in FIGS. 3a and 3b, including: an edge-lighting type backlight source 301, a liquid crystal display panel 302 disposed at a light exit side of the side-lighting backlight source 301, and a light controlling component 303 disposed between the liquid crystal display panel 302 and the side-lighting backlight source 301; wherein, the side-lighting backlight source 301 includes a light guide plate 3011 and a plurality of light emitting devices, such as light emitting diodes 3012, disposed at a side of the light guide plate 3011; the light guide plate 3011 includes a plurality of first regions 401 and a light emitting brightness of each of the first regions 401 is controllable by at least one light emitting diode 3012; the light emitting brightness of the first regions 401 is controlled according to an image to be displayed by a corresponding display region of the liquid crystal display panel, as shown in FIG. 4;

the light controlling component 303 includes a plurality of second regions 501 and at least one of the second regions 501 is covered by one of the first regions 401; the light transmittance of each second region 501 is controlled according to the contrast of the image to be displayed by a corresponding display region of the liquid crystal display panel 302, as shown in FIG. 5.

In an embodiment of the present disclosure, the side-lighting backlight source 301 has a thickness of about 5 mm, the liquid crystal display panel 302 has a thickness of about 1.4 mm and the light controlling component 303 has a thickness of about 1.3 mm. It can be seen that the display device, as shown in FIG. 3b, provided by the embodiment of the present disclosure has a thickness C of about 7.7 mm, achieving a super thinned display device.

Further, controlling the brightness of the light emitting face of the first region 401 and the light transmittance of the second region 501 covered by the first regions 401 according to the image to be displayed may increase a dynamic contrast of the image to be displayed by the corresponding region of the liquid crystal display panel 302; that is, the dynamic contrast of the image to be displayed by the corresponding region of the liquid crystal display panel 302 may be increased by cooperation of the first region 401 and the second region 501 covered by the first region 401.

For example, when the dynamic contrast of the image to be displayed is 20000:1, it is needed to control a dark state brightness of the image to be displayed to be less than or equal to 0.05 nit, that is, the light transmittance of the corresponding second region 501 of the light controlling component 303 needs be modulated to be 0%, i.e., to be in a complete dark state. As it is only an ideal state that no light is transmitted, it is impossible to achieve the dark state brightness of the image to be displayed to be less than or equal to 0.05 nit by only adjusting the light transmittance of the second region 501 of the light controlling component 303. In this instance, a brightness of the light emitting face of the first region 401 that covers the second region 501 may be adjusted to be 0, that is, the light emitting diode 3012 that controls the brightness of the first region 401 is turned off, so that no light will be emitted from the second region 501 and the dark state brightness of the displaying image is achieved to be less than or equal to 0.05 nit, which meets requirement of the dynamic contrast of 20000:1 of the displayed image and real and local high dynamic contrast.

In an embodiment, in order for convenient provision of the light emitting diode 3012, in the display device according to the embodiment, the plurality of light emitting diodes 3012 disposed at a side of the light guide plate 3011 may form a plurality of a plurality of lamp bars 3013. For example, in an exemplary embodiment, as shown in FIG. 4, there are total twenty four first regions 401 and the brightness of each of the first regions 401 is controlled by one respective light emitting diode 3012; twenty four light emitting diodes 3012 disposed at a side of the light guide plate 3011 form four lamp bars 3013, that is, every six light emitting diodes 3012 constitute one lamp bar 3013. Of course, in practice, a plurality of light emitting diodes 3012 may be provided to control the brightness of a corresponding one of the first regions 401 as required, and the number of the lamp bars 3013 may be set appropriately according to the total number of the light emitting diodes 3012, and the present disclosure is not limited to this.

In a display device according to an embodiment of the present disclosure, as shown in FIG. 4, the light emitting diode 3012 may control the brightness of the corresponding first region 401 so that the corresponding first region 401 presents a bright state L1, a gray state H1 or a dark state A1. Further, as shown in FIG. 5, The light transmittance of the second regions 501 in the light controlling component 303 may be adjusted according to an image to be displayed by the corresponding regions in the liquid crystal display panel 302 so that the second regions 501 present the brightness state L2, the gray state H2 or the dark state A2.

Generally, the light guide plate 3011 is in an oblong structure, and thus in the above display device according to the embodiments of the present disclosure, the plurality of light emitting diodes 3012 are disposed at a side of the light guide plate 3011. Specifically, the plurality of light emitting diodes 3012 may be disposed in one of the following seven manners:

in a first manner, all of the plurality of light emitting diodes 3012 are disposed at a shorter side of the light guide plate 3011;

in a second manner, all of the plurality of light emitting diodes 3012 are disposed at a longer side of the light guide plate 3011;

in a third manner, the plurality of light emitting diodes 3012 are disposed at two shorter sides of the light guide plate 3011 respectively;

in a fourth manner, the plurality of light emitting diodes 3012 are disposed at two longer sides of the light guide plate 3011 respectively;

in a fifth manner, the plurality of light emitting diodes 3012 are disposed at two shorter sides and one longer side of the light guide plate 3011 respectively;

in a sixth manner, the plurality of light emitting diodes 3012 are disposed at two longersides and one shorter side of the light guide plate 3011 respectively; and in a seventh manner, the plurality of light emitting diodes 3012 are disposed at four sides of the light guide plate 3011 respectively.

In three mannners where the plurality of light emitting diodes 3012 are disposed at two longer sides of the light guide plate 3011 respectively, the plurality of light emitting diodes 3012 are disposed at two longer sides and one shorter side of the light guide plate 3011 respectively, and the plurality of light emitting diodes 3012 are disposed at four sides of the light guide plate 3011 respectively, it is favorable for obtaining increased number of the first regions 401, and thus one of the three mannners may be selected to be implemented in practice.

In the display device according to an embodiment of the present disclosure, as shown in FIG. 3a and FIG. 4, the light guide plate 3011 or the light emitting face thereof is in a shape of rectangle, and the plurality of light emitting diodes 3012 are disposed at two longer sides of the light guide plate 3011 respectively. The configuration of this embodiment leads to a simplified process, reduced manufacturing cost and increased number of the first regions 401, facilitating to achieve a high dynamic contrast, when compared with the embodiment where the plurality of light emitting diodes 3012 are disposed at two longer sides and one shorter side of the light guide plate 3011 respectively and the embodiment where the plurality of light emitting diodes 3012 are disposed at four sides of the light guide plate 3011 respectively.

Specifically, the light guide plate 3011 converts the light emitted by the light emitting diodes 3012 into light that has a light distribution in form of a plane light source such that the light is then incident to the liquid crystal display panel via the second regions 501 so as to achieve an image display. In the above display device provided by the embodiments of the present disclosure, in order to ensure the light emitted by the light emitting diodes 3012 may be perpendicularly incident to the liquid crystal display panel 302 as more as possible so as to improve the image contrast of the liquid crystal display panel 302, the light emitting face of the light guide plate 3011 is provided with a light guide structure configured to control the light to be emitted perpendicularly.

Optionally, in the display device provided by the embodiment of the present disclosure, the light guide structure is configured to be a ridge-shaped structure extending along the shorter side, such that the light emitted by the light emitting diodes 3012, after guided by the light guide structure of the light guide plate 3011, may distribute uniformly and perpendicularly imping to the liquid crystal display panel 302. Of course, the light guide structure may be other type of light guide component, for example, a prism, and is not limited herein.

Figure 6:
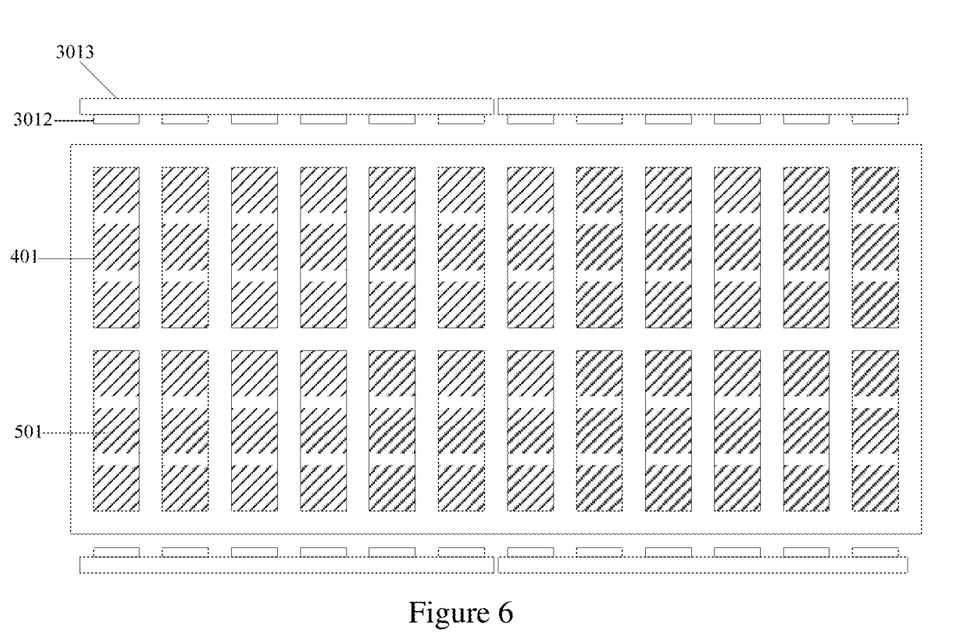
FIG. 6 is a schematic view of a displaying principle of a display device provided by an embodiment of the present disclosure.

In practice, in the display device provided by an embodiment of the present disclosure, a column of the first regions 401 correspond to a column of the second regions 501, and one of the first regions 401 covers multiple second regions 501 of the column of the second regions 501. For example, as shown in FIG. 6, a column of the first regions 401 correspond to a column of the second regions 501, and one of the first regions 401 covers three second regions 501 of the column of the second regions 501. As another example, when there are thirty two columns of the first regions 401 and the light emitting diodes 3012 are respectively disposed at two longer sides of the light guide plate 3011, the first regions 401 may be arranged in two rows and sixty four first partitioning blocks 401 may be obtained; the second regions 501 are arranged in an array having thirty two columns and sixteen rows, thereby there are totally one hundred and twelve second regions 501; in this case, one of the first regions 401 covers eight second regions 501 of one column of the second regions 501.

It is noted that sizes of the first region 401 shown in FIG. 4 and the second region 501 shown in FIG. 5 neither represent actual sizes of them in practice, nor reflect a scale relationship between them. Further, a scale in FIG. 4 does not correspond to that in FIG. 5. FIG. 6 illustrates a schematic top view of the display device, in which the side-lighting backlight source 301, the liquid crystal display panel 302 and the light controlling component 303 are overlapped with each other. As such, in FIG. 6, multiple second regions 501 in one column of the second regions 501 are located over one of the first regions 401. One of the first regions 401 covering multiple second regions 501 in one column of the second regions 501 means that one of the first regions 401 covers a range where multiple second regions 501 in one column of the second regions 501 are located, or one of the first regions 401 corresponds to multiple second regions 501 of one column of the second regions 501.

In practice, in the display device according to an embodiment of the present disclosure, the light controlling component 303 includes: an array substrate and a counter substrate that are disposed to be opposite to each other, and a light modulating layer disposed between the array substrate and the counter substrate to control a light transmittance; where the array substrate and the counter substrate have no light resistance film. As both the array substrate and the counter substrate of the light controlling component 303 have no light resistance film, that is, the light controlling component 303 has no light resistance film, the light emitted by the light guide plate 3011 will not be filtered by any light resistance film when passing through the light controlling component 303 and thus the light controlling component 303 has a much increased light transmittance relative to a conventional display panel, even has a light transmittance of approximately 100%.

Generally, in order to ensure light may pass through the light controlling component 303, the array substrate and the counter substrate may be made of a transparent material such as glass or polymethyl methacrylate, which will not be particularly limited herein.

Specifically, in the display device according to an embodiment of the present disclosure, the light modulating layer may be a liquid crystal layer or a electrochromic layer. When the light modulating layer is a liquid crystal layer, the light transmittance may be further controlled by driving deflection of liquid crystal molecules. The light transmittance may be changed in a range from 0 to 100% by driving the liquid crystal molecules to deflect to different extents, such that the second regions 501 present different states such as a dark state, a gray state or a brightness state.

From the above description, it can be seen that, in the above display device according to embodiments of the present disclosure, the light controlling component 303 is a liquid crystal panel or a electrochromic panel without any light resistance film and the only difference of the light controlling component 303 from a conventional liquid crystal display panel or electrochromic display panel resides in that the light controlling component 303 has no light resistance film or layer. Thus, when the light controlling component 303 is a liquid crystal panel without any light resistance film, it may be manufactured by using masks that are provided to manufacture layers excluding the light resistance film of the liquid crystal display panel in the display device according to embodiments of the present disclosure, thereby avoiding exploiting new mask and thus reducing manufacturing cost.

In the display device according to an embodiment of the present disclosure, the light controlling component 303 may include a plurality of pixel units and each of the second regions 501 include at least one pixel unit; and the pixel units of the light controlling component 303 are in one-to-one correspondance to the pixel units of the liquid crystal display panel 302.

Figure 7:
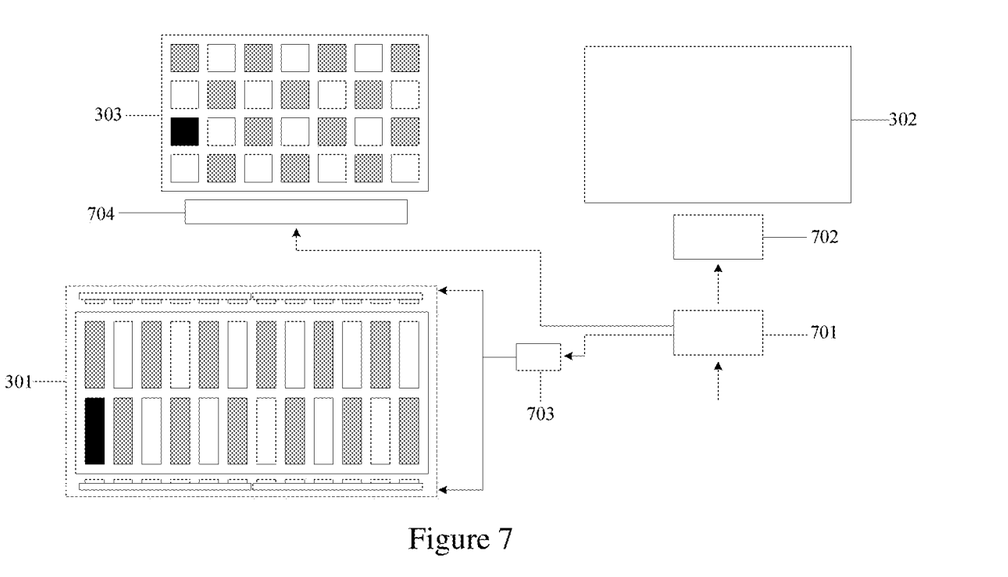
FIG. 7 is a schematic view of a control circuit of a display device provided by an embodiment of the present disclosure.

In practice, the display device according to embodiments of the present disclosure, as shown in FIG. 7, further includes: control circuits 702, 703, 704 that are respectively in one-to-one correspondance to and in electrical connection with the side-lighting backlight source 301, the liquid crystal display panel 302 and light controlling component 303; and a processor 701 that is connected with the control circuits.

The processor 701 is configured to acquire a contrast of an image currently displayed and a contrast of an image to be displayed by the liquid crystal display panel 302 through the control circuit 702 connected with the liquid crystal display panel 302, respectively determine brightness required for the light emitting face of the respective first region 401 in the side-lighting backlight source 301 and the light transmittances required for the second regions 501 in the light controlling component 303, adjust the brightness of the respective first region 401 by using the control circuit 703 connected with the side-lighting backlight source 301 and adjust the light transmittances of the respective second regions 501 by using the control circuit 704 connected with the light controlling component 303.

In addition, in the above display device according to embodiments of the present disclosure, the liquid crystal display panel 302 may be a twisted nematic liquid crystal display panel, an advanced dimension switch (ADS) liquid crystal display panel, a high-aperture-ratio advanced dimension switch (HADS) liquid crystal display panel, or an in-plane switch (IPS) liquid crystal display panel, and is not particularly limited herein. The liquid crystal display panel 302 may be in various sizes suitable for display devices in different sizes, for example, a television in a large size or a smart watch in a relative small size, which will not be particularly limited herein. The light emitting device in the display device in the present disclosure is illustrated by giving an example of the light emitting diode, and however, other type of light emitting device may be implemented.

Based on a same disclosed concept, embodiments of the present disclosure provide a method of driving the above display device. Embodiments of the method may be referred to the embodiments of the display device in the present disclosure and are thus not repeatedly described herein as the principle of the method is the same as that of the display device.

Figure 8:
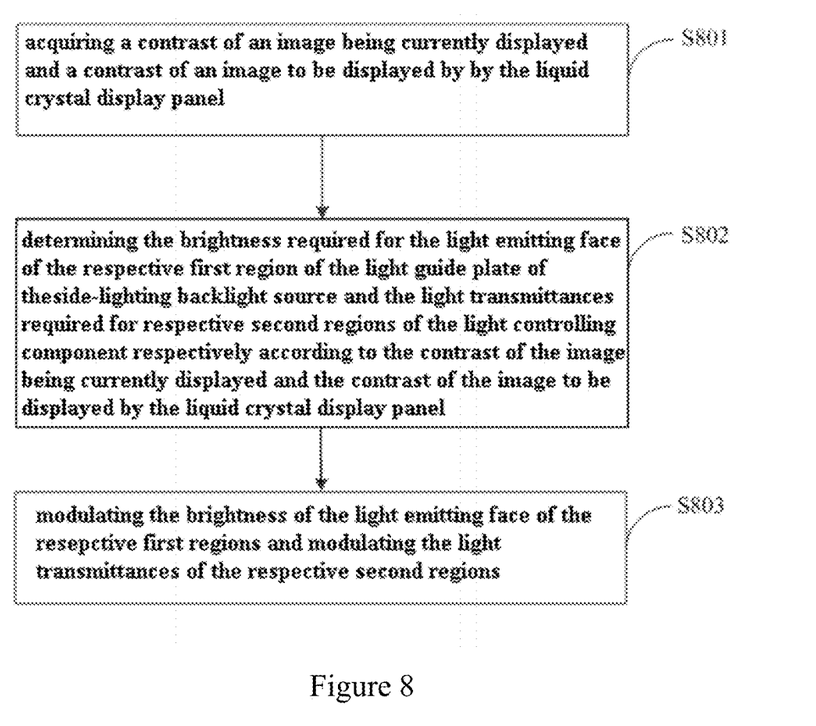
FIG. 8 is a flow chart of a method of driving a display device provided by an embodiment of the present disclosure.

Embodiments of the present disclosure provide a method of driving the above display device, as shown in FIG. 8, the method specifically including following steps:

S801, acquiring a contrast of an image being currently displayed and a contrast of an image to be displayed by the liquid crystal display panel;

S802, determining the brightness required for the light emitting face of the respective first region of the light guide plate of the side-lighting backlight source and the light transmittances required for respective second regions of the light controlling component respectively according to the contrast of the image being currently displayed and the contrast of the image to be displayed by the liquid crystal display panel; and S803, modulating the brightness of the light emitting face of the respective first regions and modulating the light transmittances of the respective second regions.

In the above display device and the method of driving the same according the embodiments of the present disclosure, the display device includes: a side-lighting backlight source, a liquid crystal display panel disposed at a light exit side of the side-lighting backlight source, and a light controlling component disposed between the liquid crystal display panel and the side-lighting backlight source; the side-lighting backlight source comprises a light guide plate and a plurality of light emitting devices disposed at a side of the light guide plate; the light guide plate includes a plurality of first regions and a brightness of the light emitting face of each of the first regions is controllable by at least one light emitting device according to an image to be displayed by a corresponding region of the liquid crystal display panel; the light controlling component includes a plurality of second regions and at least one of the second regions is covered by one of the first regions, a light transmittance of each of the second regions is controlled according to the image to be displayed by a corresponding region of the liquid crystal display panel. On one hand, since the backlight source in the display device provided by the embodiments of the disclosure is an side-lighting backlight source with a very small thickness, a thinned display device can be obtained; on the other hand, the brightness of the light emitting face of the first region and the light transmittance of the second region that is covered by the first regions may be controlled according to the image to be displayed such that the dynamic contrast of the image to be displayed by the corresponding region in the liquid crystal display panel may be increased; that is, the dynamic contrast of the image to be displayed by the corresponding region in the liquid crystal display panel may be increased by cooperation of the first region and the second region covered by the first region. Thus, embodiments of the present disclosure provide an ultrathin display device with a higher dynamic contrast.

The display device according to embodiments of the present disclosure may include: a side-lighting backlight source, a display panel disposed at a light exit side of the side-lighting backlight source, and a light controlling component arranged between the display panel and the side-lighting backlight source. Herein, the display panel may be other type of display panel and is not limited to a liquid crystal display panel. Based on the above disclosed contents, those skilled in the art may apply a display panel in other form to the display device in the present disclosure.

It is noted that, in the context, terms such as "first", "second" are merely intended to distinguish an entity, operation or step from another entity, operation or step, instead of requiring or implying any relationship or order for these entities or operations or steps.

Obviously, various changes and modifications to the embodiments of the present disclosure may be made by those skilled in the art without departing from spirits and scope of the present disclosure. These changes and modifications to the embodiments of the present disclosure are also included in the present disclosure if they belong to scope defined by the claims and their equivalents.

The invention claimed is:

1. A display device comprising: a side-lighting backlight source, a display panel at a light exit side of the side-lighting backlight source, and a light controlling component between the display panel and the side-lighting backlight source; wherein, the side-lighting backlight source comprises a light guide plate and a plurality of light emitting devices at a side of the light guide plate, the plurality of light emitting devices being configured to emit light to the light guide plate from the side of the light guide plate; the light guide plate includes a plurality of first regions and a brightness of a light emitting face of each of the first regions is controllable by at least one of the plurality of light emitting devices according to a contrast of an image to be displayed by a corresponding display region of the display panel;

the light controlling component is configured to transmit light from the light guide plate to the display panel and comprises a plurality of second regions, the plurality of second regions being configured such that one of the first regions corresponds to at least one of the second regions such that light from the one of the first regions passes through the at least one of the second regions; and the light controlling component is configured to control a light transmittance of each of the second regions according to the contrast of the image to be displayed by the corresponding region of the display panel:

the display device further includes:

control circuits being in one-to-one correspondence to and in electrical connection with the side-lighting backlight source, the display panel and the light controlling component; and a processor electrically connected to the control circuits; wherein, the processor is configured to acquire a contrast of an image being currently displayed and a contrast of an image to be displayed by the display panel through the control circuits electrically connected to the display panel, determine the brightness of the light emitting face required for respective first region of the side-lighting backlight source and light transmittances required for respective second regions of the light controlling component according to the contrast of the image being currently displayed and the contrast of the image to be displayed, and modulate the brightness of the light emitting face of the respective first region by using the control circuit electrically connected to the side-lighting backlight source and the light transmittances of the respective second regions by the control circuit electrically connected to the light controlling component, such that the light coming from the side-lighting backlight source and passing through the light controlling component permits the display panel to display an image with a desired contrast.

2. The display device according to claim 1, wherein the light guide plate is in a shape of rectangle and the light emitting devices are at two longer sides of the light guide plate respectively.

3. The display device according to claim 2, wherein a light guide structure is provided on a light emitting face of the light guide plate and configured to control light to be emitted perpendicularly to the display panel.

4. The display device according to claim 2, wherein one column of the first regions correspond to one column of the second regions and one first region of the one column of the first regions corresponds to multiple second regions of the one column of the second regions such that light from the one first region of the one column of the first regions passes through the multiple second regions of the one column of the second regions.

5. The display device according to claim 2, wherein the light controlling component includes a plurality of pixel units and each of the second regions comprises at least one pixel unit.

6. The display device according to claim 1, wherein a light guide structure is provided on a light emitting face of the light guide plate and configured to control light to be emitted perpendicularly to the display panel.

7. The display device according to claim 6, wherein the light guide structure is a ridge structure extending along a shorter side of the light guide plate.

8. The display device according to claim 6, wherein one column of the first regions correspond to one column of the second regions and one first region of the one column of the first regions corresponds to multiple second regions of the one column of the second regions such that light from the one first region of the one column of the first regions passes through the multiple second regions of the one column of the second regions.

9. The display device according to claim 6, wherein the light controlling component includes a plurality of pixel units and each of the second regions comprises at least one pixel unit.

10. The display device according to claim 1, wherein one column of the first regions correspond to one column of the second regions and one first region of the one column of the first regions corresponds to multiple second regions of the one column of the second regions such that light from the one first region of the one column of the first regions passes through the multiple second regions of the one column of the second regions.

11. The display device according to claim 10, wherein the light controlling component includes a plurality of pixel units and each of the second regions comprises at least one pixel unit.

12. The display device according to claim 1, wherein the light controlling component comprises:

an array substrate and a counter substrate opposite to each other, and a light modulating layer between the array substrate and the counter substrate, the light modulating layer being configured to control a light transmittance; wherein the light controlling component comprises no light resistance layer.

13. The display device according to claim 12, wherein the light modulating layer is a liquid crystal layer or an electrochromic layer.

14. The display device according to claim 1, wherein the light controlling component includes a plurality of pixel units and each of the second regions comprises at least one pixel unit.

15. The display device according to claim 14, wherein the pixel units of the light controlling component are in one-to-one correspondence to pixel units of the display panel.

16. A method of driving the display device according to claim 1, wherein the display device includes: a side-lighting backlight source, a display panel at a light exit side of the side-lighting backlight source, and a light controlling component between the display panel and the side-lighting backlight source; wherein, the side-lighting backlight source comprises a light guide plate and a plurality of light emitting devices at a side of the light guide plate, the plurality of light emitting devices being configured to emit light to the light guide plate from the side of the light guide plate; the light guide plate includes a plurality of first regions and a brightness of a light emitting face of each of the first regions is controllable by at least one of the plurality of light emitting devices according to a contrast of an image to be displayed by a corresponding display region of the display panel;

the light controlling component is configured to transmit light from the light guide plate to the display panel and comprises a plurality of second regions, the plurality of second regions being configured such that one of the first regions corresponds to at least one of the second regions such that light from the one of the first regions passes through the at least one of the second regions; and the light controlling component is configured to control a light transmittance of each of the second regions according to the contrast of the image to he displayed by the corresponding region of the display panel;

the display device further includes:

control circuits being in one-to-one correspondence to and in electrical connection with the side-lighting backlight source, the display panel and the light controlling component; and a processor electrically connected to the control circuits; wherein, the processor is configured to acquire a contrast of an image being currently displayed and a contrast of an image to he displayed by the display panel through the control circuits electrically connected to the display panel, determine the brightness of the light emitting face required for respective first region of the side-lighting backlight source and light transmittances required for respective second regions of the light controlling component according to the contrast of the image being currently displayed and the contrast of the image to he displayed, and modulate the brightness of the light emitting face of the respective first region by using the control circuit electrically connected to the side-lighting backlight source and the light transmittances of the respective second regions by the control circuit electrically connected to the light controlling component, such that the light coming from the side-lighting backlight source and passing through the light controlling component permits the display panel to display an image with a desired contrast;

wherein the method comprises:

acquiring a contrast of an image currently displayed and a contrast of an image to be displayed by the display panel;

determining the brightness required for the light emitting face of respective first region of the side-lighting backlight source and light transmittances required for respective second regions of the light controlling component respectively according to the contrast of the image being currently displayed and the contrast of the image to be displayed by the display panel; and modulating the brightness of the light emitting face of the respective first region to a desired brightness and modulating the light transmittances of the respective second regions to desired light transmittances, such that the light coming from the side-lighting backlight source and passing through the light controlling component permits the display panel to display an image with a desired contrast.

* * * * *